(12) United States Patent
Cutting et al.

(10) Patent No.: US 12,694,445 B2
(45) Date of Patent: *Jul. 28, 2026

(54) SYSTEMS AND METHODS FOR PROVIDING DIGITAL TRUSTED DATA

(71) Applicant: Wells Fargo Bank, N.A., San Francisco, CA (US)

(72) Inventors: Clyde E. Cutting, San Francisco, CA (US); Keith W. Harris, San Francisco, CA (US); Erik Pilz, Palo Alto, CA (US); Wei Su, San Francisco, CA (US); Eduardo DeLA Torre, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/669,282

(22) Filed: May 20, 2024

(65) Prior Publication Data

US 2024/0311908 A1 Sep. 19, 2024

Related U.S. Application Data

(63) Continuation of application No. 16/195,592, filed on Nov. 19, 2018, now Pat. No. 11,989,774.

(Continued)

(51) Int. Cl.
*G06Q 40/03* (2023.01)

(52) U.S. Cl.
CPC ..................................... *G06Q 40/03* (2023.01)

(58) Field of Classification Search
None
See application file for complete search history.

(56) References Cited

U.S. PATENT DOCUMENTS

| | | | |
|---|---|---|---|
| 5,892,900 A | 4/1999 | Ginter et al. | |
| 6,088,700 A | 7/2000 | Larsen et al. | |

(Continued)

FOREIGN PATENT DOCUMENTS

| | | |
|---|---|---|
| CN | 102171716 | 8/2011 |
| CN | 102479180 | 5/2012 |

(Continued)

OTHER PUBLICATIONS

Akram et al "Digital trust-trusted computing and beyond: A position paper." 2014 IEEE 13th International Conference on Trust, Security and Privacy in Computing and Communications. IEEE, 2014, pp. 884-892 (Year: 2014).

(Continued)

*Primary Examiner* — Gregory S Cunningham, II
(74) *Attorney, Agent, or Firm* — Foley & Lardner LLP

(57) ABSTRACT

Systems, methods, and apparatuses are described for providing trusted data. A digital trusted data (DTD) computing system of a service provider can accept requests for trusted data from internal computing systems and/or external computing systems of third parties. Based on the data requested, a retrieval protocol is determined, the retrieval protocol identifying trusted data sources and a sequence (order and/or timing) for accessing the data sources. The trusted data sources may, for example, be internal computing systems, external computing systems, and/or documents provided by a client. The requested data may be used for populating a form being completed by the client as part of an application for services from the service provider or from a third party.

(Continued)

Data can be retrieved from data sources that are less cumbersome for the client before sources that are more cumbersome are accessed.

20 Claims, 5 Drawing Sheets

Related U.S. Application Data

(60) Provisional application No. 62/588,747, filed on Nov. 20, 2017.

(56) References Cited

U.S. PATENT DOCUMENTS

| | | | |
|---|---|---|---|
| 6,922,843 | B1 | 7/2005 | Herrington et al. |
| 7,062,567 | B2 | 6/2006 | Benitez et al. |
| 7,095,855 | B1 | 8/2006 | Collins |
| 7,653,592 | B1 | 1/2010 | Flaxman et al. |
| 7,886,963 | B1 | 2/2011 | Barth |
| 7,925,579 | B1 | 4/2011 | Flaxman et al. |
| 8,191,769 | B1 | 6/2012 | Barth |
| 8,255,991 | B1 | 8/2012 | Hackborn et al. |
| 8,359,070 | B1 | 1/2013 | Zhu |
| 8,423,451 | B1 | 4/2013 | Flaxman et al. |
| 8,489,498 | B1 | 7/2013 | Flaxman et al. |
| 8,511,545 | B1 | 8/2013 | Barth |
| 8,898,743 | B1 | 11/2014 | Kowalik et al. |
| 9,246,921 | B1 | 1/2016 | Vlaminck et al. |
| 9,313,203 | B2 | 4/2016 | Adler et al. |
| 9,338,007 | B1 | 5/2016 | Doshi |
| 9,426,836 | B2 | 8/2016 | Johnsson |
| 9,525,690 | B2 | 12/2016 | Burgess et al. |
| 9,628,558 | B2 | 4/2017 | Wouhaybi |
| 9,635,028 | B2 | 4/2017 | Shepard et al. |
| 9,691,051 | B2 | 6/2017 | Rexer et al. |
| 9,710,807 | B2 | 7/2017 | Theurer et al. |
| 9,860,253 | B2 | 1/2018 | Cairns |
| 9,996,825 | B1 | 6/2018 | Casey et al. |
| 10,003,587 | B2 | 6/2018 | Kobayashi |
| 10,009,773 | B2 | 6/2018 | Smith et al. |
| 10,025,933 | B2 | 7/2018 | Wadley et al. |
| 10,097,552 | B2 | 10/2018 | Wadley et al. |
| 10,205,718 | B1 | 2/2019 | Chang et al. |
| 10,380,619 | B2 | 8/2019 | Pontious |
| 10,437,610 | B2 | 10/2019 | Wadley et al. |
| 10,469,484 | B1 | 11/2019 | Chen et al. |
| 10,635,692 | B2 | 4/2020 | Eigner et al. |
| 10,679,271 | B2 | 6/2020 | Singh et al. |
| 10,740,372 | B2 | 8/2020 | Matsumoto |
| 10,791,197 | B2 | 9/2020 | Alsina et al. |
| 10,909,524 | B2 | 2/2021 | Van Os et al. |
| 10,915,886 | B1 | 2/2021 | Anderson |
| 10,949,608 | B2 | 3/2021 | Terra et al. |
| 10,992,679 | B2 | 4/2021 | Fakhraie et al. |
| 11,055,593 | B1 | 7/2021 | Sherif |
| 11,063,925 | B1 | 7/2021 | Vera et al. |
| 11,106,515 | B1 | 8/2021 | Fakhraie et al. |
| 11,245,682 | B2 | 2/2022 | Kukreja et al. |
| 11,606,219 | B2 | 3/2023 | Wright et al. |
| 11,615,402 | B1 | 3/2023 | Pearce et al. |
| 11,689,927 | B2 | 6/2023 | Smith et al. |
| 11,700,129 | B2 | 7/2023 | Tang et al. |
| 11,882,126 | B2 | 1/2024 | Dunjic et al. |
| 11,928,236 | B1 | 3/2024 | Fakhraie et al. |
| 2002/0095571 | A1 | 7/2002 | Bradee |
| 2002/0173295 | A1 | 11/2002 | Nykanen et al. |
| 2003/0112306 | A1 | 6/2003 | Simpson et al. |
| 2005/0086176 | A1 | 4/2005 | Dahlgren et al. |
| 2005/0198563 | A1* | 9/2005 | Kristjansson ......... G06F 40/174 |
| | | | 715/224 |
| 2005/0254514 | A1 | 11/2005 | Lynn |
| 2005/0289114 | A1 | 12/2005 | Bellamy |
| 2005/0289348 | A1 | 12/2005 | Joy et al. |
| 2006/0112198 | A1 | 5/2006 | Kurokawa et al. |

| | | | |
|---|---|---|---|
| 2006/0150247 | A1 | 7/2006 | Gafken |
| 2008/0098292 | A1* | 4/2008 | Embry ................. G06F 40/174 |
| | | | 715/224 |
| 2008/0133274 | A1 | 6/2008 | Warner |
| 2008/0134297 | A1 | 6/2008 | Clinick et al. |
| 2009/0055936 | A1 | 2/2009 | Eberstaller |
| 2009/0313630 | A1 | 12/2009 | Hori |
| 2011/0078098 | A1 | 3/2011 | Lapir et al. |
| 2011/0113473 | A1 | 5/2011 | Corda et al. |
| 2011/0239270 | A1 | 9/2011 | Sovio et al. |
| 2011/0271173 | A1 | 11/2011 | Ait-Mokhtar et al. |
| 2012/0047162 | A1 | 2/2012 | Guglietti et al. |
| 2012/0290445 | A1 | 11/2012 | Wilson et al. |
| 2012/0291102 | A1 | 11/2012 | Cohen |
| 2012/0310760 | A1 | 12/2012 | Phillips et al. |
| 2013/0024371 | A1 | 1/2013 | Hariramani et al. |
| 2013/0085835 | A1 | 4/2013 | Horowitz |
| 2013/0132854 | A1 | 5/2013 | Raleigh et al. |
| 2013/0227652 | A1 | 8/2013 | Choi et al. |
| 2013/0254660 | A1 | 9/2013 | Fujioka |
| 2013/0318592 | A1 | 11/2013 | Grier et al. |
| 2013/0346302 | A1 | 12/2013 | Purves et al. |
| 2014/0007195 | A1 | 1/2014 | Gupta |
| 2014/0059565 | A1 | 2/2014 | Ko et al. |
| 2014/0067650 | A1 | 3/2014 | Gardiner et al. |
| 2014/0122989 | A1 | 5/2014 | Eigner et al. |
| 2014/0123057 | A1 | 5/2014 | Eigner et al. |
| 2014/0215573 | A1 | 7/2014 | Cepuran |
| 2014/0258828 | A1 | 9/2014 | Lymer et al. |
| 2014/0282894 | A1 | 9/2014 | Manton |
| 2014/0344232 | A1 | 11/2014 | Kludy |
| 2014/0351583 | A1 | 11/2014 | Bettale et al. |
| 2014/0359098 | A1 | 12/2014 | Xu |
| 2014/0365781 | A1 | 12/2014 | Dmitrienko et al. |
| 2014/0379801 | A1 | 12/2014 | Gupta |
| 2015/0007283 | A1 | 1/2015 | Brugger et al. |
| 2015/0020777 | A1 | 1/2015 | Carey et al. |
| 2015/0186871 | A1 | 7/2015 | Laracey |
| 2015/0205777 | A1 | 7/2015 | Campanelli et al. |
| 2015/0215305 | A1 | 7/2015 | Wetzel et al. |
| 2015/0248393 | A1 | 9/2015 | Watanabe |
| 2015/0281238 | A1 | 10/2015 | Kumar et al. |
| 2015/0294406 | A1 | 10/2015 | Dixon et al. |
| 2015/0339464 | A1 | 11/2015 | Kode et al. |
| 2015/0373523 | A1 | 12/2015 | Jeong et al. |
| 2016/0085609 | A1 | 3/2016 | Lu et al. |
| 2016/0117659 | A1 | 4/2016 | Bedier et al. |
| 2016/0191534 | A1 | 6/2016 | Mallozzi |
| 2016/0210626 | A1 | 7/2016 | Ortiz et al. |
| 2016/0364721 | A1 | 12/2016 | Deliwala et al. |
| 2017/0012982 | A1 | 1/2017 | Carter |
| 2017/0055109 | A1 | 2/2017 | Van Nieuwenhuyze |
| 2017/0070527 | A1 | 3/2017 | Bailey et al. |
| 2017/0161973 | A1 | 6/2017 | Katta et al. |
| 2017/0169424 | A1 | 6/2017 | Maddocks et al. |
| 2017/0213212 | A1 | 7/2017 | Dicker |
| 2017/0262891 | A1 | 9/2017 | Green et al. |
| 2017/0289197 | A1 | 10/2017 | Mandyam et al. |
| 2017/0344384 | A1 | 11/2017 | Wadley et al. |
| 2017/0344745 | A1 | 11/2017 | Wadley et al. |
| 2017/0346823 | A1* | 11/2017 | Wadley ................. G06Q 10/40 |
| 2018/0039988 | A1 | 2/2018 | Gupta |
| 2018/0191701 | A1 | 7/2018 | Kong et al. |
| 2018/0211055 | A1 | 7/2018 | Balijepalli et al. |
| 2018/0213059 | A1 | 7/2018 | Alsina et al. |
| 2018/0268399 | A1 | 9/2018 | Spector et al. |
| 2018/0330371 | A1 | 11/2018 | Tadiparti |
| 2018/0341650 | A1 | 11/2018 | Faith et al. |
| 2018/0373396 | A1 | 12/2018 | Mullen |
| 2019/0019186 | A1 | 1/2019 | Falah et al. |
| 2019/0068575 | A1 | 2/2019 | Vongsouvanh et al. |
| 2019/0138698 | A1 | 5/2019 | Qiu |
| 2019/0172059 | A1 | 6/2019 | Castagna et al. |
| 2019/0318122 | A1 | 10/2019 | Hockey et al. |
| 2020/0034164 | A1 | 1/2020 | Wadley et al. |
| 2020/0134714 | A1* | 4/2020 | De Gaia ........... G06F 16/90348 |
| 2020/0167760 | A1 | 5/2020 | Makhotin |
| 2020/0356682 | A1 | 11/2020 | Gu |
| 2020/0364720 | A1 | 11/2020 | Lally et al. |

(56)      References Cited

U.S. PATENT DOCUMENTS

| | | |
|---|---|---|
| 2020/0382328 A1 | 12/2020 | Bhattacharya |
| 2021/0075782 A1 | 3/2021 | Dunjic et al. |
| 2021/0118084 A1 | 4/2021 | Dharmar et al. |
| 2021/0126823 A1 | 4/2021 | Poess et al. |
| 2021/0152542 A1 | 5/2021 | Gimenez Palop et al. |

FOREIGN PATENT DOCUMENTS

| | | |
|---|---|---|
| EP | 0 962 098 B1 | 12/1999 |
| RU | 2602789 C2 | 11/2016 |
| WO | WO-2017/116488 A1 | 7/2017 |

OTHER PUBLICATIONS

Fidelity—Third-Party Marketplace—"Streamline your workflow with integrations between Fidelity and third-party technology providers," https://clearingcustody.fidelity.com/app/item/RD_9883093/third-party-tools.html, pp. 1-11.

Huang et al., "An integrated software processor with autofilling out web forms," 2008 13th Asia-Pacific Computer Systems Architecture Conference, 2008, pp. 1-8 (Year: 2008).

Huang et al., "An integrated software processor with autofilling out web forms," 2008, 13th Asia-Pacific Computer Systems Architecture Conference, 2008, pp. 1-8 (Year: 2018).

Pentland et al. "Towards an Internet of Trusted Data: A New Framework for Identity and Data Sharing" Aug. 2016, MIT Connection Science, Input to the Commission on Enhancing National Cybersecurity, pp. 1-19 (Year: 2016).

Rofle, Alex, Barclays quick to embrace Open Banking with 3rd party account view in banking app, https://www.paymentscardsandmobile.com/barclays-quick-to-embrace-open-banking-with-3rd-party-account-view-in-banking-app/, pp. 1-4.

Solapurkar, P., "Building secure healthcare services using OAuth 2.0 and JSON web token in IOT cloud scenario," 2016 2nd International Conference on Contemporary Computing and Informatics (IC31), Greater Noida, India, 2016, pp. 99-104 (Year: 2016).

* cited by examiner

| | |
|---|---|
| Receive Request for Trusted Data 305 | Return Error in Request 307 |
| Determine Retrieval Protocol 310 | Return Unavailability of Data 312 |
| Access and Retrieve Data 315 | Return Error in Access / Authentication 317 |
| Analyze Retrieved Data 320 | Return Insufficiency of Data Error 322 |
| Return Trusted Data 325 | |

SYSTEMS AND METHODS FOR PROVIDING DIGITAL TRUSTED DATA

CROSS REFERENCE TO RELATED APPLICATION

This application is a continuation of U.S. patent application Ser. No. 16/195,592 filed Nov. 19, 2018, which claims priority to U.S. Provisional Patent Application No. 62/588,747 filed Nov. 20, 2017, each of which is incorporated herein by reference in its entirety.

BACKGROUND

Often, when a consumer provides information to a business, or when a business receives information from a consumer, the information requires verification or other scrutiny. This is particularly important with high-value or high-risk transactions, such as home and car purchases, or when applying for a loan or credit. Verification of information is conventionally performed by one or more representatives of the business, who may compare information provided by a customer (on a form, for example) with information found in other documents, such as documents of governmental bodies and other private entities. Such a process is time-consuming and costly for both consumers and for businesses.

When applying for a home loan, for example, a loan application is completed typically by the loan applicant or the potential lender. In some cases, the loan applicant may apply for loans with several different potential lenders, each requiring submission of a loan application, intending to ultimately select the lender that offers the best terms. The loan applications for each potential lender can be different, and may require the applicant to provide different information and supporting documentation. However, this process is tedious for both the applicant and the potential lenders. For example, in order to obtain financial information required by a loan application, the applicant may have to search for information that is stored and provided by multiple parties. The underwriter of the lender then has to verify such information as the gross income, assets, debts, savings, and credit score, among other information, of the applicant to determine whether the applicant qualifies for the loan. Current such processes are not only time consuming, inefficient, and paper intensive, but they also require the applicant to locate and provide documentation that may be difficult for the applicant to obtain. Similar obstructions and inefficiencies exist for other products and services that require verification of applicant information, such as opening a bank account, applying for a credit card, and so forth.

Businesses may lose out on commercial opportunities when consumers are deterred by onerous processes, and consumers may lose out on achieving desired goals if they lack the time, resources, patience, or desire to engage in the onerous process. Inefficiencies in such processes can also reduce competition and keep the costs of goods and services higher than they otherwise would be.

SUMMARY

Various example embodiments relate to systems, methods, and apparatuses for providing digital trusted data. In example embodiments, a method for providing digital trusted data (DTD) comprises providing a form to a client computing device of a client. The form may be provided by an internal computing system of a service provider. The form may be used by the client to apply for a service. The form may include one or more fields to be populated with data about the client. The internal computing system may send a request for the data to a DTD computing system of the service provider. The request may identify the client and the data. The DTD computing system may determine a retrieval protocol based on the request. The retrieval protocol may identify a first trusted data source and a second trusted data source. The retrieval protocol may further identify a sequence for accessing the first trusted data source and the second trusted data source. The DTD computing system may access at least one of the first trusted data source and the second trusted data source according to the retrieval protocol. The DTD computing system may send data about the client to the internal computing system, the data having been retrieved by the DTD computing system from at least one of the first trusted data source and the second trusted data source. The internal computing system may populate one or more fields in the form with the retrieved data from the DTD computing system.

In other example embodiments, a system for providing digital trusted data may comprise a DTD computing system of a service provider. The DTD computing system may comprise a processor, and a network interface that allows the DTD computing system to be communicatively coupled with an internal computing system of the service provider. The DTD computing system may be configured to receive, from the internal computing system, a request for data about a client. The data may be requested for a form provided by the internal computing system to a client computing device of the client, the form having one or more fields to be populated with the data. The DTD computing system may determine a retrieval protocol based on the request, the retrieval protocol identifying a first trusted data source and a second trusted data source. The retrieval protocol may further identify a sequence for accessing the first trusted data source and the second trusted data source. The DTD computing device may access at least one of the first trusted data source and the second trusted data source according to the retrieval protocol. The DTD computing device may retrieve data from at least one of the first trusted data source and the second trusted data source. The DTD computing device may send retrieved data about the client to the internal computing system for use in populating the form.

In other example embodiments, a method, implemented via a DTD computing system of a service provider, for providing digital trusted data may comprise receiving, from an external computing system of a third party, a request for data about a client of at least one of the service provider and the third party. The request may identify the client and the data. A retrieval protocol may be determined based on the request, the retrieval protocol identifying a first trusted data source and a second trusted data source. The retrieval protocol may further identify a sequence for accessing the first trusted data source and the second trusted data source. At least one of the first trusted data source and the second trusted data source may be accessed according to the retrieval protocol. Data from at least one of the first trusted data source and the second trusted data source may be retrieved. Data about the client may be sent to the external computing system, the data having been retrieved from at least one of the first trusted data source and the second trusted data source.

These and other features and benefits, together with the organization and manner of operation thereof, will become apparent from the following detailed description when taken in conjunction with the accompanying drawings.

DETAILED DESCRIPTION

Figure 1:
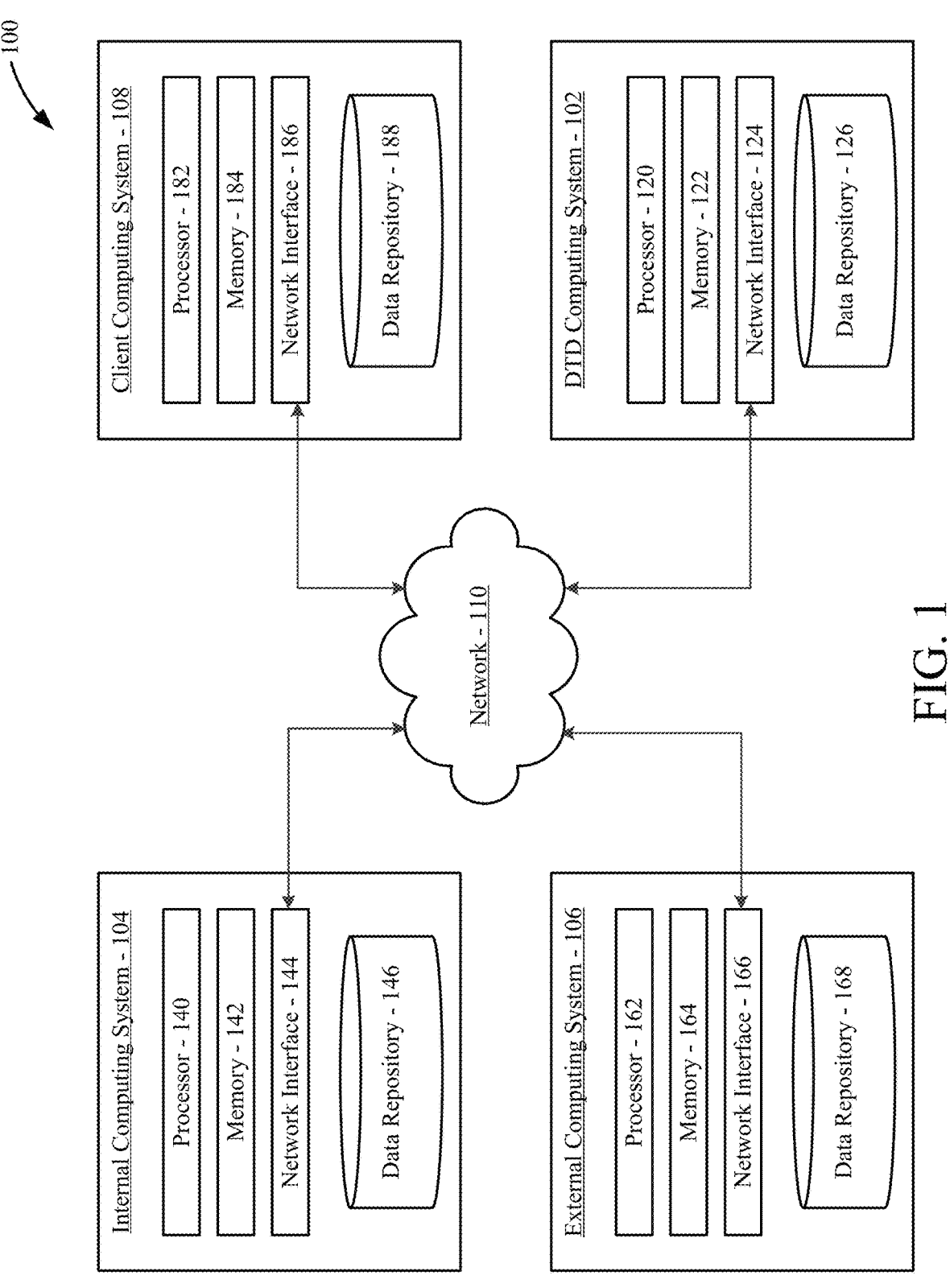
FIG. 1 is a diagram of an example computing system according to one or more embodiments.

Embodiments of the present disclosure relate to systems, methods, and apparatuses for providing digital trusted data source (DTDS) services. A digital trusted data (DTD) computing system, which may be a computing system of a service provider (e.g., a financial institution such as a bank), may be used to implement DTDS services. The DTD computing system enables inbound data sharing (e.g., receiving customer data from a third party) to reduce the burden on a customer (e.g., an applicant for a financial product such as a loan) to locate and provide documentation held by the provider or by disparate entities and systems. The DTDS services may also reduce the time involved in processing the application, for example, by verifying the customer's data. Verification of information in evaluating whether the information can be "trusted" can include determining or confirming that the source of the information provided is acceptably trustworthy, that the information is not contradicted by, or inconsistent with, other available information, and/or that the information is corroborated by information from other sources. The DTD computing system may be structured to also enable outbound data sharing (e.g., sharing customer data with external computing systems of third parties) to facilitate the control of customer data without requiring the customer or a third party to extract the data from the service provider's website or systems (such as by using web scraping tools). The DTD computing system may interface with external computing systems via, for example, one or more gateways, third party interfaces, application program interfaces (APIs), etc. for outbound sharing of data.

The embodiments for providing digital trusted data described herein improve computer-related technology by performing certain steps that cannot be done by conventional data retrieval systems or human actors. For example, an internal computing device (of a service provider) may provide a client computing device (of a client) with an application for a service, and that application may require certain trusted data about the client as part of the application. Rather than having the client provide the required data (which would then be accepted without scrutiny, or verified by agents of the service provider in a time-intensive, costly, and/or subjective manner), the internal computing system may request data from a DTD computing system of the service provider. The DTD computing device may evaluate the request and determine which trusted data sources-which may be internal (e.g., data sources maintained by the service provider), and/or external (e.g., data sources maintained by third parties)-could provide the required data about the client. The retrieval protocol could be determined so as to minimize wait time for the service provider and/or the client, cost to the service provider and/or the client, and/or effort by the client in completing the application. For example, the retrieval protocol may identify multiple trusted data sources and, based on various factors, determine in what sequence the data sources will be accessed, and whether they should be accessed in series (i.e., sequentially) or in parallel. Factors on which selections of data sources and the order in which they are accessed may include, for example: trustworthiness of the data from a particular data source; reliability of the data source via a network when needed (e.g., percentage of downtime for the data source); response times for receiving the required data (or other reply) from a data source; fees associated with accessing a data source; the degree to which the data source will provide the specific required data with little to no further processing needed to extract the information being sought; whether additional information is required from the client to be able to access the data source, and if so, the inconvenience to the client to provide the additional information; etc. The application may include a form, and the internal computing system may automatically populate one or more fields of the form with data from the DTD computing system.

Moreover, to pinpoint the specific data that is desired, and objectively enhance the trustworthiness of the data received from accessed data sources, the DTD computing system may, for example, automatically obtain data from multiple sources in parallel, and consolidate the data before sending the data to the internal computing system for use as part of the application. Overlapping data from multiple sources may be, for example, cherry-picked based on which data sources are deemed more reliable for certain data or types of data than others. In case of an inconsistency or contradiction, a set of rules may be applied regarding which sources will be deemed to be more "trusted" than, or otherwise prioritized over, other sources for certain information. Applying, in a consistent and objective manner, a set of rules for obtaining and evaluating data from trusted data sources allows the service provider to make better decisions on whether to accept or deny an application for services. Because of the consistency in how trusted data is obtained and used over time, data on past results is more useful for use in revising the criteria used to evaluate applications. For example, data on past results may indicate which applications were accepted based on data that was selected for use in evaluating the applications, and whether the decisions to accept turned out to be good or poor (i.e., misinformed or otherwise ill-advised) decisions based on which data was selected over other data, and whether the other data that was not selected, had the other data been selected instead of what was actually selected, would have resulted in a different decision that would have been preferable in hindsight; in such a case, the other data may be considered relatively more reliable or otherwise useful than before, and/or the criteria may be revised based on the availability of the same or similar data in the future. Embodiments thus achieve benefits over conventional approaches and solve a technical problem of improving, with minimal effort from customers applying for services, the availability and quality of trusted data used in processing applications for services. Also, embodiments described herein solve the technical and internet-centric problem of accepting applications for services via a network, and obtaining the trusted data that is needed to make informed decisions on the applications in an automated fashion.

Referring to FIG. 1, a block diagram of a digital trusted data system 100 is shown according to one or more example embodiments. As described herein, the digital trusted data system 100 enables the implementation of digital trusted data source (DTDS) services. The digital trusted data system 100 includes a digital trusted data (DTD) computing system 102 of a service provider, with the DTD computing system 102 in communication with a plurality of computing systems 104, 106, 108. Each computing system 102, 104, 106, 108 may include, for example, one or more mobile computing devices (such as smartphones, tablets, laptops, etc.), non-mobile computing devices (such as desktop computers, workstations, servers, etc.), or a combination thereof. As further discussed below, computing systems 102, 104, 106, 108 are communicably coupled to each other over a network 110, which may be any type of communications network. For example, the network 110 may involve communications using wireless network interfaces (e.g., 802.11X, ZigBee, Bluetooth, Internet), wired network interfaces (e.g., Ethernet, USB, Thunderbolt), or any combination thereof to enable network connections between systems. Such network connections are not limited to particular equipment, or to particular communication sessions, such that the same network interface need not be used, nor the communication remain uninterrupted, for an information exchange to be considered a network connection. Rather, as used here, network connections refer to communications between two systems using any devices and during any number of sessions separated in time. The network is structured to permit the exchange of data, values, instructions, messages, and the like between the computing systems 102, 104, 106, 108 via such network connections.

Computing system 104 includes a processor 140, a memory 142, and a network interface 144. The processor 140 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the computing system 104. The memory 142 (e.g., RAM, ROM, NVRAM, Flash Memory, hard disk storage) may store data and/or computer code for facilitating at least some of the various processes described herein. In this regard, the memory 142 may store programming logic that, when executed by the processor 140, controls the operation of the computing system 104. The network interface 144 may be structured to allow the computing system 104 to communicate data to and from other devices (via network 110) either directly or indirectly. The computing system 104 may be, for example, an internal computing system (with one or more computing devices) of the service provider (i.e., the provider of the DTDS services), with a data repository 146 that may be a source of, or destination for, trusted data, as further discussed below.

Computing system 106 includes a processor 162, a memory 164, and a network interface 166. The processor 162 may be implemented as a general-purpose processor, an ASIC, one or more FPGAs, a DSP, a group of processing components, or other suitable electronic processing components structured to control the operation of the computing system 106. The memory 164 (e.g., RAM, ROM, NVRAM, Flash Memory, hard disk storage) may store data and/or computer code for facilitating at least some of the various processes described herein. In this regard, the memory 164 may store programming logic that, when executed by the processor 162, controls the operation of the computing system 106. The network interface 166 may be structured to allow the computing system 106 to communicate data to and from other systems (via network 110) either directly or indirectly. The computing system 106 may be an external computing system (with one or more computing devices) of any third-party (i.e., an entity other than the service provider), with a data repository 168 that may be a source of, or destination for, trusted data, as further discussed below.

Computing system 108 includes a processor 182, a memory 184, and a network interface 186. The processor 182 may be implemented as a general-purpose processor, an ASIC, one or more FPGAs, a DSP, a group of processing components, or other suitable electronic processing components structured to control the operation of the computing system 108. The memory 184 (e.g., RAM, ROM, NVRAM, Flash Memory, hard disk storage) may store data and/or computer code for facilitating at least some of the various processes described herein. In this regard, the memory 184 may store programming logic that, when executed by the processor 182, controls the operation of the computing system 108. The network interface 186 may be structured to allow the computing system 108 to communicate data to and from other systems (via network 110) either directly or indirectly. The computing system 108 may be a client computing system (with one or more computing devices) of a customer or other client, which may be any person, organization, or other entity that receives goods, services, and/or information from (and/or via) the service provider or a third party. A data repository 188 of the client computing system 108 may be a source of, or destination for, trusted data, as further discussed below.

Computing system 102 includes a processor 120, a memory 122, and a network interface 124. The processor 120 may be implemented as a general-purpose processor, an ASIC, one or more FPGAs, a DSP, a group of processing components, or other suitable electronic processing components structured to control the operation of the computing system 102. The memory 122 (e.g., RAM, ROM, NVRAM, Flash Memory, hard disk storage) may store data and/or computer code for facilitating at least some of the various processes described herein. In this regard, the memory 122 may store programming logic that, when executed by the processor 120, controls the operation of the computing system 102. The network interface 124 may be structured to allow the computing system 102 to communicate data to and from other systems (via network 110) either directly or indirectly. The trusted data system 102 may be a DTD computing system 102 of the service provider. The digital trusted data system 100 may be arranged, for example, such that the DTD computing system 102 operates as a server, and computing systems 104, 106, and 108 operate as clients.

The service provider's DTD computing system 102 also includes a data repository 126 that can store information obtained via one or more of the computing systems 104, 106, 108, or that was received previously through other means (e.g., as a result of past dealings with clients). The data repository can be, for example, one or more databases with structured data, unstructured data, or a combination of structured and unstructured data. The data in the data repository 126 could be arranged to be accessible to computing systems 104, 106, 108 with proper authentication. In certain versions, some or all of the data may be stored on separate local or remote computing devices that are accessible to, or via, the DTD computing system 102. The data repository 126 may also include data received from other computing systems and devices, such as the internal computing system 104, the external computing system 106, and the client computing system 108. For example, if the service provider is a financial institution, and the DTD computing system 102 is administered by (or on behalf of) the service provider, the data repository 126 may include client information from financial accounts that may be stored on one or more separate systems that could be co-located with, or remote to, the DTD computing system 102.

Figure 2:
FIG. 2 depicts a digital trusted data source (DTDS) service capable of interacting with internal applications as well as external applications via a gateway according to one or more embodiments.
Figure 2:
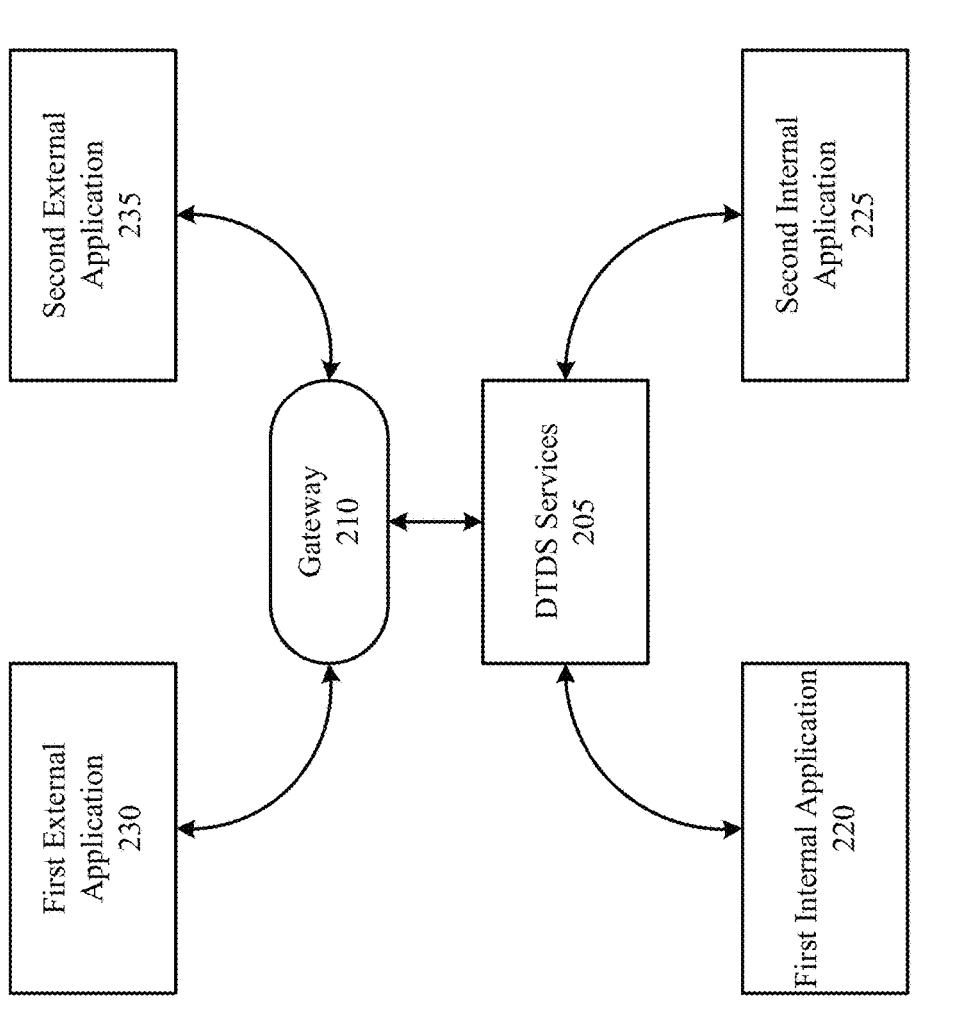

Referring to FIG. 2, an example system 200 depicts digital trusted data source (DTDS) services 205 for acquiring and providing trusted data. The DTDS services 205 may be implemented using, for example, software executed by one or more devices of the DTD computing system 102 and/or the internal computing system 104. This may include software applications executed by a computing device as well as, for example, code running on dedicated hardware (such as dedicated security devices), in some implementations. The service provider may receive requests for trusted data from internal applications 220, 225 that are executed by, for example, one or more devices of the internal computing system 104. The trusted data may be available in data repository 126, or may be retrieved from one or more external computing systems 106. The internal applications 220, 225 may be, for example, applications of other lines of business, divisions, etc., of the service provider. If the service provider is a financial institution, example internal applications may include applications of such lines of business as home loans, car loans, personal loans, student loans, credit cards, brokerage accounts, etc. The DTDS services 205 allows trusted data to be shared across an enterprise in a secure manner. In one example, the trusted data includes client data such as data on income of an applicant that is to be utilized as part of a loan application to be submitted by the client via one or more computing devices of the client computing system 108.

The service provider may additionally receive requests for trusted data from external applications 230, 235 that are executed by one or more devices of one or more external computing systems 106 (of one or more third parties). The external applications 230, 235 may be applications of, for example, other financial institutions, credit reporting agencies, the Early Warning system, etc. Exchange of trusted data with external computing systems 106 may be accomplished via a gateway 210 that may be implemented using the DTD computing system 102. The gateway 210 may be, for example, a networked access portal (accessible via, e.g., the internet) or other virtual intermediary that allows computing systems to access certain data if acceptable security protocols are satisfied (such as identity verification and account authentication). Gateway 210 may, in some embodiments, provide a user interface (e.g., to allow a user to identify the trusted data that is desired) that may be accessible via the internet or other network, such as via a web browser, mobile device application, or other network application. In other embodiments, the gateway 210 may be automated, without the need for manual input via a user interface.

The internal applications 220, 225 may also be used by the DTD computing system 102 to access data that is stored in one or more data repositories 146 of one or more internal computing systems 104. Similarly, the external applications 230, 235 may be used by the DTD computing system 102 to access data that is stored in one or more data repositories 168 of one or more external computing systems 106. For example, the DTD computing system 102 may receive a request for trusted data via internal application 220 being executed on a first internal computing system 104, and/or via external application 230 being executed on a first external computing system 106. The DTD computing system 102 may know or determine that the trusted data being requested is available in a second internal computing system 104, and/or in a second external computing system 106 (of the same entity as the first external computing system, or of a different entity). The requested data may be accessed by the DTD computing system 102 via internal application 225 being executed on the second internal computing system 104, and/or via external application 235 being executed on the second external computing system 106. The DTD computing system 102 thus enables exchange of trusted data to and from one or more internal computing systems 104 and/or one or more external computing systems 106.

It is noted that an application (internal or external) may be executed on one device of a computing system (such as the internal computing system or the external computing system), but the data accessed may be stored in one or more data repositories of another device that is part of the same computing system or part of another computing system. For example, an internal application may be executed on a first device of an internal computing system, and the data requested may be stored on a second device of the internal computing system, and/or on one or more devices of one or more external computing systems. Similarly, an external application may be executed on a first device of a first external computing system, and the data requested may be stored on a second device of the first external computing system, on one or more devices of a second external computing system, and/or on one or more devices of an internal computing system.

Figure 3:
FIG. 3 is a flow diagram of an example method for a DTDS service according to one or more embodiments.
Figure 3:
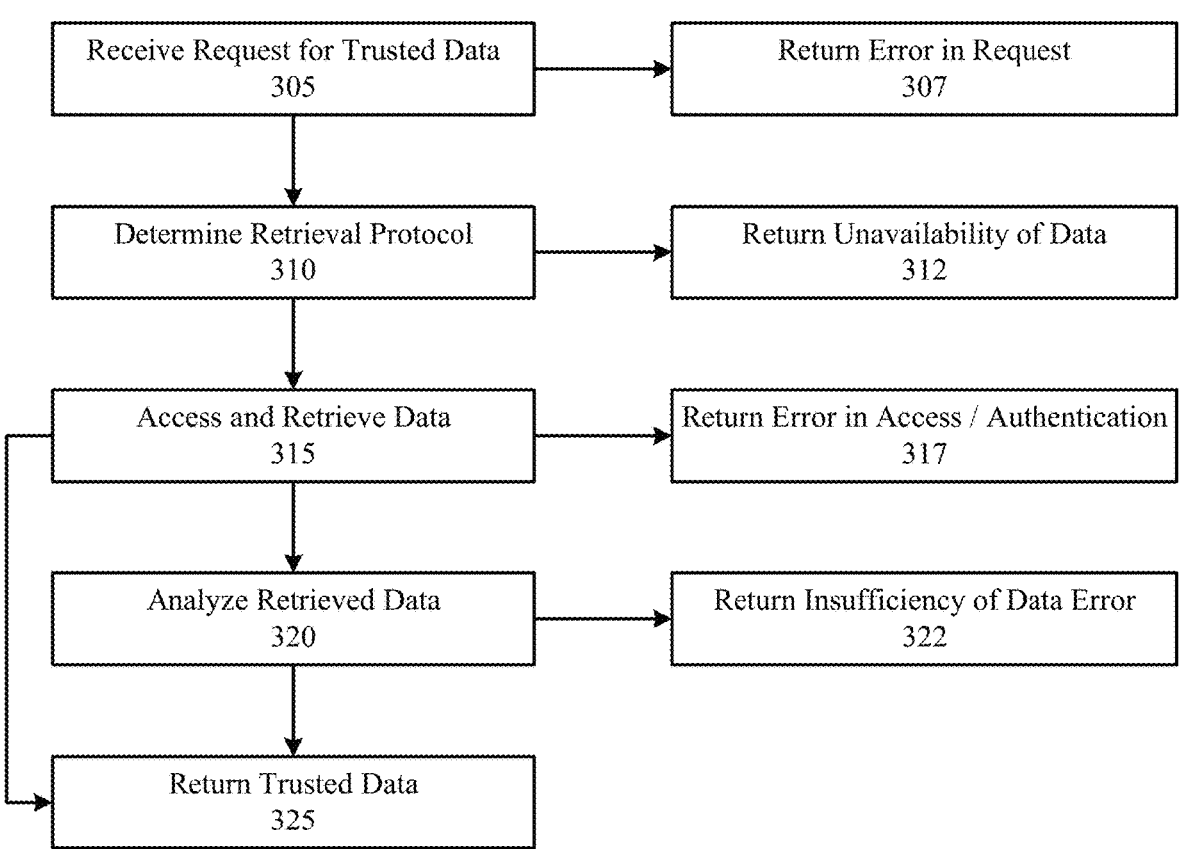

Referring to FIG. 3, an example method 300 for providing trusted data is provided. At 305, DTDS services 205 (via DTD computing system 102) receives a request for data. Requests may arise from customer actions performed using the client computing system 108, such as initiation of a loan application. The request may be accompanied by certain input data. For example, the request may specify that certain limited data are desired (a specific, or "surgical" approach), or the request may indicate that all available data are desired (a general, or "dump truck" approach). A surgical request may indicate, for example, that a list of transactions of a certain type within a specified time period are desired, whereas a dump truck request might indicate that transactions of all types for all available dates are desired. The request may additionally include certain identifying data associated with the requested data, such as a social security number if the requested data is related to the credit of a customer, or an address if the requested data relates to certain property. The request may further include certain authenticating data (such as credentials) if access to applicable trusted data sources requires additional authentication.

The request may be provided via an internal application 220, 225 executed by the internal computing system 104, or the request may be provided via an external application 230, 235 executed by the external computing system 106. The source of the request may depend, for example, at least in part on which services are being requested by a customer, and on which entity would provide the requested services (such as the service provider or a third party). The request may be on-demand or "in real time," such that the trusted data is accessed when needed (e.g., after a customer begins an application for a loan). In certain implementations, certain trusted data may be retrieved (e.g., once, a limited number of times, on a periodic basis) for ready availability if needed at a future time. Such "pre-demand" retrieval of trusted data may be based on a likelihood that the trusted data will be needed within a certain amount of time into the future, and/or such retrieval may be based on the time or difficulty of acquiring such trusted data from the particular sources of the trusted data (e.g., if a source of trusted data is a bottleneck because it takes significantly longer to provide the desired trusted data, or is less reliably accessible when needed).

The request may be for trusted data, such as personal or financial information that is preferably commonly verified or otherwise receives relatively greater scrutiny. Such a request is particularly useful for information that, if incorrect or in error, can have significant repercussions (e.g., in terms of costs and/or risks) for a service provider. For example, such a request may be for income information to be used in determining whether to issue a loan, and if the income information is incorrect, an evaluation of the risk to the loan provider may be incorrect. Such erroneous evaluations may result in a loan being issued when it would not have otherwise been issued because it would be deemed too risky for the loan provider, or a loan being issued at an interest rate that does not correspond with the risk to the loan provider (such as the risk of default) for issuing the loan to the customer.

At 310, the DTDS services 205 may determine a retrieval protocol. The retrieval protocol may identify which sources of trusted data are to be accessed for the trusted data. Sources of trusted data may include, for example, one or more internal computing systems 104 (corresponding with, e.g., one or more lines of business or divisions of the service provider) and/or one or more external computing systems 106 (corresponding with, e.g., financial institutions, data collection services, governmental bodies, or other third parties). The retrieval protocol may further identify, if two or more sources are to be accessed for the trusted data, a sequence (i.e., order and/or timing) for accessing the data sources (as will be further discussed in the context of FIG. 4). The DTDS services 205 may include a database or other catalogue or data source identifying what types of information are available in accessible data sources, and the retrieval protocol may be determined at least in part on such a database.

The retrieval protocol may be, for example, as simple as an identification of a source of trusted data to be accessed, or it may be more complex, identifying, for example, a set of sources to be accessed for certain data and a set of other sources to be accessed for other requested data. The retrieval protocol may also indicate timing, such as an order in which the sources will be accessed for the trusted data, and/or an amount of time that the DTDS services 205 will wait to receive a response from a data source before considering the source to be nonresponsive. Additionally or alternatively, retrieval protocols may indicate that certain sources are conditionally accessed, such as a second source being accessed on the condition that certain trusted data is or is not obtained from a first source. As another example, a second source (such as a second credit reporting agency) may be accessed on the condition that a first source (such as a first credit reporting agency) returns data (such as a credit score) within a particular range or above/below a threshold (such as below 600).

In certain embodiments, retrieval protocols may be predetermined based on, for example, the type of data being requested, dates applicable to the requested data, and/or on inputs provided with the request for trusted data. In other embodiments, the retrieval protocol may be determined or customized once a request (or set of requests) is received. For example, a retrieval protocol may be dynamically generated to include a first set of selected sources by default (e.g., internal databases with account information and Early Warning), a second set of sources if certain data are received as part of the data request (e.g., a credit agency if social security number and birthdate are received as part of the data request), and/or a third set of sources based on what data are received from the first set of sources (e.g., a second credit agency if an individual's creditworthiness score from a first credit agency is determined to be below a threshold).

At 315, the DTDS services 205 may attempt to access and retrieve the trusted data from one or more sources according to the retrieval protocol. At 325, the trusted data may be returned to the computing system (such as internal computing system 104 or external computing system 106) that requested the trusted data. Optionally, at 320, before the data is returned, the retrieved data may be analyzed to determine its sufficiency or utility (as will be further discussed in the context of FIG. 5).

Instead of returning trusted data, certain error messages may be returned if there is a fault or breakdown in the process. At 307, a message indicating an error in the request for trusted data may be returned. This may be warranted if, for example, the request is from an unauthorized source, is for certain types of data that are not provided through DTDS services 205, has an error in syntax, is not communicated in satisfaction of applicable security protocols, is not accompanied by required inputs/strings, etc.

If the request that is received is not in error or is otherwise accepted, but it is determined that no retrieval protocol can be devised to satisfy the request, at 312, a message indicating that the requested data is unavailable may be returned. This may be appropriate if, for example, the DTD computing system 102 does not have access to any data source that would allow the DTD computing system 102 to retrieve the trusted data, or is not able to retrieve the trusted data in an acceptable amount of time (e.g., 30 seconds, one minute, 15 minutes, etc.). For example, a request for information about a customer dating back 10 years may be received, but it may be determined that none of the sources of trusted data maintains customer data dating back that far. In such a scenario, an unavailability of data message may be returned.

If a retrieval protocol can be devised or is available, there may nonetheless be some error in the implementation of the retrieval protocol. If that is the case, at 317, a message indicating an error in access or authentication may be returned by the DTDS services 205. This may result if, for example, a data source is currently offline or otherwise inaccessible, or, for example, does not have the requested trusted data for a particular customer (even though such data are available for other customers). This may also result if, for example, the DTDS services 205 could not be properly authenticated by a data source to allow access to the requested trusted data from that data source.

If some data is received by the DTDS services 205, but analysis of the data reveals that the data received from one or more data sources is, for example, incomplete or is otherwise unresponsive to the data request in some way, at 322, the DTDS services 205 may return a message indicating that the trusted data is insufficient. This may occur, for example, if transactions of a certain type are requested, and none of the accessed data sources include data on the type of transactions.

It is noted that in certain implementations, if there is a breakdown in the data retrieval process, the DTDS services 205 may return a general error message that does not indicate the stage at which the process broke down. For example, it may be deemed appropriate to provide general error messages to external applications 230, 235 of external computing systems 106, and more specific error messages (such as 307, 312, 317, 322) to internal applications 220, 225 requesting trusted data from the DTDS services 205. In other implementations, certain types of more specific error messages may be provided to certain applications (such as error messages at 307 and 317), while more generalized error messages (such as error messages at 312 or 322) may be provided to other applications of other systems.

Figure 4:
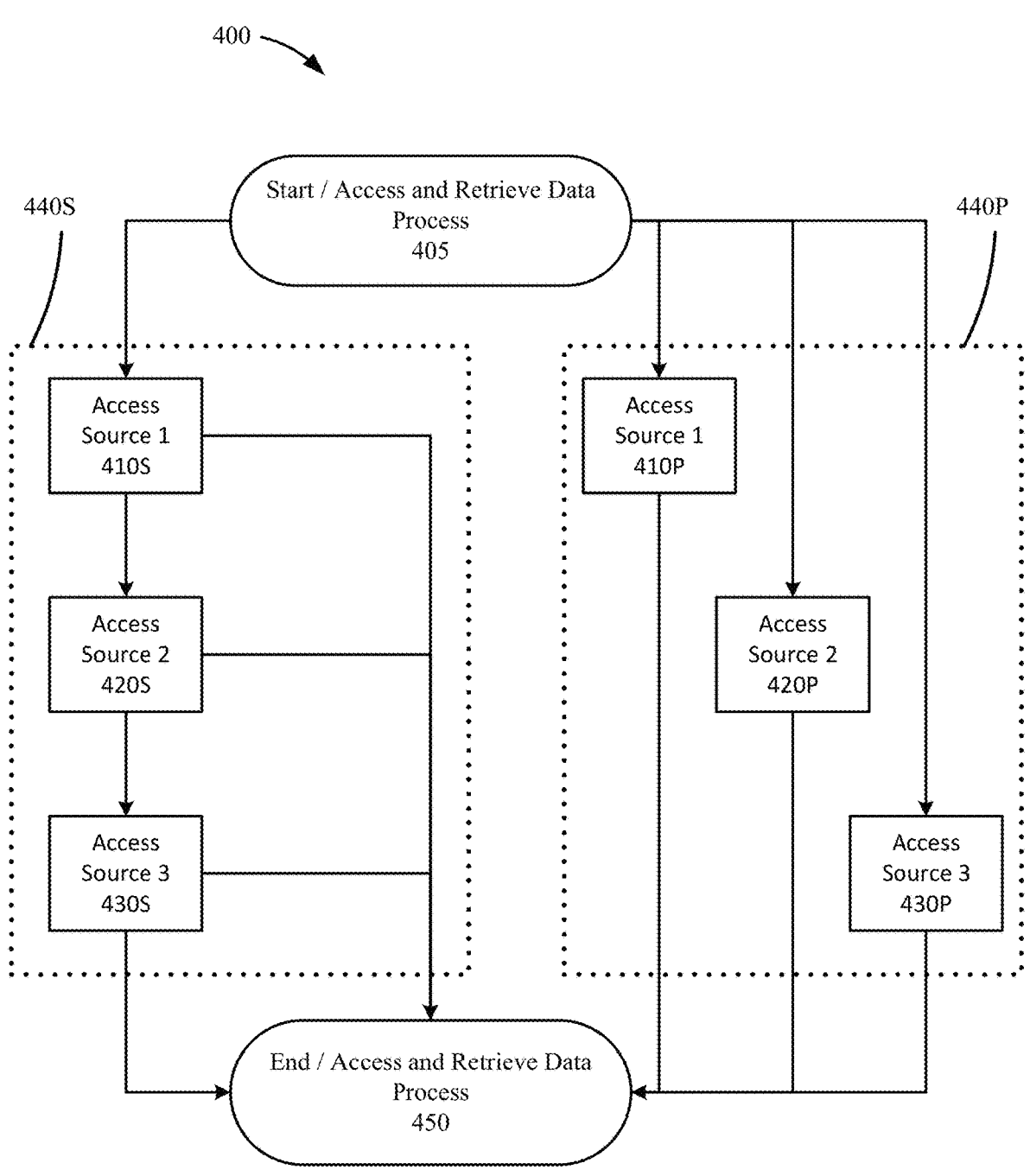
FIG. 4 is a flow diagram for an example data access and retrieval process in the DTDS services method of FIG. 3 according to one or more embodiments.

Referring to FIG. 4, a method 400 for accessing and retrieving data 405 is provided (see 315 in FIG. 3). A retrieval protocol, as discussed above, may indicate that a set of sources will be accessed in serial fashion 440S (i.e., one after another). At 410S, a first source may be accessed, after which a second source may be accessed at 420S, after which a third source may be accessed at 430S. It is noted that, after the first source is accessed at 410S, the process may end at 450 without accessing the second source at 420S and without accessing the third source at 430S. Similarly, after the first source is accessed at 410S and the second source is accessed at 420S, the process may end at 450 without accessing the third source at 430S.

Alternatively, the process 405 may proceed according to a parallel scheme 440P. In a parallel scheme, a first and second source are accessed at the same time, or a second source is accessed without waiting for the process of accessing the first source to complete. Accordingly, at 410P, a first source is accessed, at the same time that a second source is accessed at 420P, and potentially also at the same time that a third source is accessed at 430P. It is noted that any combination of two or more of the first (410P), second (420P), and third (430P) sources may be accessed at the same time (i.e., without waiting to receive a response from a previously-accessed data source, such that data requests overlap in time to some extent). It is also noted that any combination of serial and parallel access deemed suitable may be implemented. For example, a first source may be accessed, followed by second and third sources being accessed in parallel (e.g., simultaneously) once accessing the first source has completed. Similarly, first and second sources may be accessed in parallel, followed by a third source once one or both of the first and second have completed. The overall scheme selected may depend on such factors as the type of data being requested, the reliability of the sources, etc.

Figure 5:
FIG. 5 is a flow diagram of an example method of using trusted data according to one or more embodiments.
Figure 5:
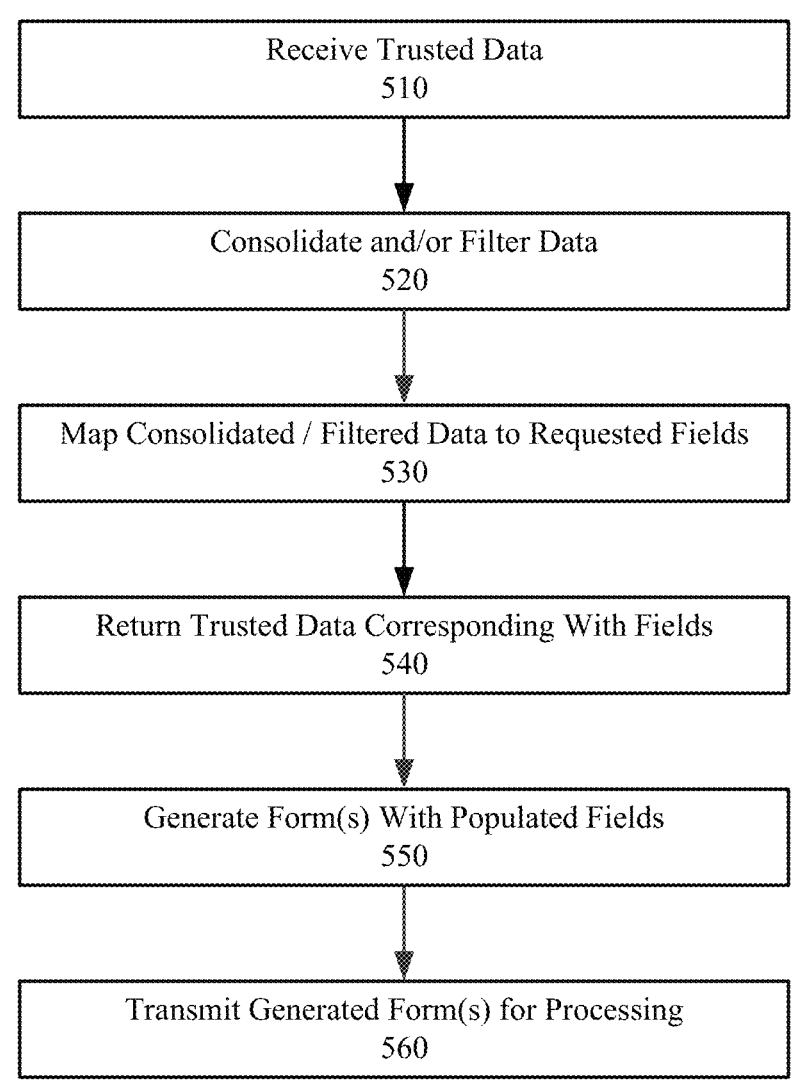

Referring to FIG. 5, a method 500 for analyzing/processing received data is depicted (see 320 in FIG. 3). At 510, trusted data is received from one or more sources as a result of an implementation of a retrieval protocol. In some cases, the trusted data received may overlap or relate to different aspects of a customer's background. For example, a first source may provide a list of transactions for 2014 to 2016, and a second source may provide a list of transactions for 2015 to 2017. To avoid redundancy, at 520, the data may be consolidated such that transactions for the overlapping period of time (such as 2015 and 2016 in the above example) are not provided in duplicate.

Such consolidation may also provide a more complete picture, as the first source may include certain information not in the second source, and vice-versa. For example, if there were five transactions in 2015, and the first source includes transactions 1, 3, and 4, while the second source includes transactions 1, 2, 4, and 5, then the data from the two sources can be consolidated so that all five transactions can be returned.

In case of an inconsistency or contradiction, a set of rules may be applied regarding which sources will be deemed to be more "trusted" than, or otherwise prioritized over, other sources for certain information. For example, if in the above example, in which both sources include transactions 1 and 4, it may be that the first source identifies a value of 145 for the transaction, while the second source identifies a value of 154 for the transaction (possibly due to the transposition of the 4 and 5 by one of the sources). If one source is determined to be more reliable (either in general or for certain types of data), then the value from that more-reliable source may be accepted and the other value rejected. In other implementations, both values may be returned to the application requesting the trusted data, with or without an identification of the specific source for each value, and with or without an indication of which value is deemed to be from a more reliable source for the particular data.

Such determinations regarding which sources are considered to be more "trustworthy" in case of inconsistencies and contradictions between the sources may be based on experience over time (e.g., historical data indicating which source has tended to be more often correct based on corroboration with data from other sources). Alternatively or additionally, other available information may be considered in evaluating the likelihood that a value from one source is more trustworthy than a value from another source. For example, regardless of whether a source has historically been more or less reliable in terms of the accuracy of trusted data therefrom, it may be determined that the value from one source is more likely to be accurate based on other information. For example, if one source states that a transaction at a merchant at an airport had a value of $0.31 while another source states that the same transaction had a value of $3.10, the higher value may be deemed more likely to be correct if it is deemed not likely that a purchase could be as low as $0.31 at an airport shop, whereas it is more plausible that one or more items could be purchased for $3.10 at the airport. In this example, the returned data may include the higher price for the transaction and reject the lower price.

In other cases, it may be that the data received from a source is more inclusive than the data that is requested. For example, a source may return all transactions for a time period, while the data request may be only for transactions of a certain type. Similarly, the source may return all transactions for all dates, but the request may be only for transactions between specified dates. In such cases, the data acquired from one or more sources may be filtered so that extraneous e.g., not requested or deemed irrelevant) data is not returned.

Once the data has been consolidated and/or filtered, at 530, the data may be mapped to particular requested fields. For example, a data request may identify a set of fields from a form being completed by a client, such as a loan application. One of the fields may be, for example, "income." The trusted data that includes information on income for a customer may be in a field that is not associated with a label of "income." Nonetheless, via one or more of the accessed sources, it may be determined that the customer has made weekly direct deposits into his or her bank account for the past year. Using that data, it may be determined that the customer's annual net pay (at least from a certain employer) is likely to be the sum of the past fifty-two weekly direct deposit amounts. That sum may then be mapped with the "income" field, even though the direct deposits were not associated with an "income" label. At 540, the mapped trusted data (corresponding with requested fields) may be returned to the application requesting the trusted data.

In certain embodiments, at 550, the mapped trusted data may be used to generate forms with fields populated using the mapped data. For example, in a mortgage loan application, the trusted data may be used to populate fields in a "Uniform Residential Loan Application" (Form 1003) for the applicant. In other applications, the trusted data may be mapped to other forms, applications (e.g., for loans or a line of credit), etc. At 560, the generated form (or application) may be transmitted for further processing, internally and/or externally.

The embodiments and implementations of the systems and methods disclosed herein improve current computing systems for providing a digital trusted data source (e.g., trusted customer data). As described herein, the digital trusted data system improves the speed of acquiring personal data and the accuracy of the acquired data by storing and structuring customer data in forms that can more efficiently be provided for numerous purposes where trusted customer data is requested and where speed of delivery of such data is desirable. Using the digital trusted data system, personal information (e.g., the identity of a person, gross income, assets, debts, savings, credit score, etc.) may be verified to facilitate the provision (e.g., execution) of services provided by, for example, a provider of financial services, such as a bank, without requiring manual entry of account information during a transaction such as, but not limited to, a loan application, funds transfer, etc. Without such requirements, the clock time, processing time, programmatic instructions required to verify data from multiple accounts and/or data sources, and other requirements of a central processing unit, memory unit, and other system components are reduced. Accordingly, verification of data and system security are improved by providing the ability to accurately identify a person, acquire personal and financial information of the person, verify the information, and use the data internally or share the data externally, etc.

Trusted data may include customer data, account data, statement data, transaction data, IRS tax data, credit reports, etc. The customer data may include asset information, liability information, payroll data, employee data, etc. The digital statement and transaction data may be received via a computing system of the service provider (e.g., internal computing system 104) or via a computing system associated with another entity (e.g., external computing system 106). For example, digital statement and/or transaction data may be shared between service providers associated with a network, consortium, organization, etc., such as the Early Warning system. In other examples, the digital trusted data may include digital income information and/or digital asset information from a third party such as, but not limited to, a third-party aggregator. In some implementations, the customer may provide paper and/or electronic documents via mail, e-mail, fax, or upload via a website. Data may be extracted from the customer-provided paper and/or electronic documents. In some examples, the data may be converted into digital trusted data that may be made available to internal and external computing systems 104, 106 via the DTD computing system 102.

The data sources may be based on, sorted, accessed, or otherwise provided according to a hierarchy, group, or other classification. For example, a first internal computing system (associated with, e.g., a first division or line of business of the service provider) may be a first data source, a second internal computing system (associated with, e.g., a second division or line of business of the service provider) may be a second data source, a first external computing system (associated with, e.g., a computing system of a consortium to which the service provider belongs, such as Early Warning) may be a third data source, a second external computing system (associated with, e.g., a third-party data aggregator such as a credit reporting agency) may be a fourth data source, and documents or other data that are not in any repository that is accessible to the DTD computing system but instead is in a document uploaded by a customer may be a fifth data source.

Each data source may be accessed in an order according to a programmatic algorithm structured to receive, sort, aggregate, provide, or otherwise manage digital trusted data. In some embodiments, the DTD computing system 102 is configured to search for and collect data using a "waterfall" data collection arrangement, such that the DTD computing system 102 collects data from the most convenient and verifiable data sources first before collecting data from another data source. The data sources may generally be arranged in increasing "friction" (i.e., progressing less smoothly) for the customer. Viewed differently, the data sources may be arranged in decreasing accessibility, verifiability, convenience (i.e., burden on the customer), etc., such that the first data source is a relatively more accessible, verifiable, and convenient data source than the second data source, which is relatively more accessible, verifiable, and convenient than the third data source, and so on, with the fifth data source being considered to generally be the least accessible, verifiable, and convenient for the customer. The DTD computing system 102 may be configured to search the first data source first, search the second data source only if the particular type of information being sought is not found in the first data source, and so forth, such that the fifth data source is not required unless the desired data is not available via the first, second, third, and fourth data sources.

In example embodiments, the service provider provides financial services, such as banking services (e.g., demand deposit accounts, credit accounts) to a plurality of customers. For example, the service provider may allow customers to apply for a loan, deposit funds into accounts, withdraw funds from accounts, transfer funds between accounts, view account balances, and the like via an internal computing system. In some examples, a customer may be an external service provider, organization, third party, etc. that may request data from and/or provide data to the service provider via a DTD computing system. The DTDS services provided via the DTD computing system may be accessible by internal computing systems and/or external computing systems via a gateway. The internal computing system may include a backend computer system that supports the DTD computing system and other services offered by the service provider. An account database, for example, may be structured to maintain accounts associated with customers of the service provider and to facilitate transactions associated with the accounts. The account database may store transaction data and account information, including account numbers, account balances, customer contact information, customer preferences, and other account information.

In an example implementation, a customer may select or otherwise input, via a client computing system, an operation (e.g., to return customer information, get transaction details, transaction detail history, statements) to be executed by a DTD computing system. In this regard, the DTD computing system may receive a request for digital trusted data. The digital trusted data request may be structured to facilitate the provision of the digital trusted data service to the customer. In some examples, the digital trusted data request may include a service call or operation. The services of the DTD computing system may be accessible to internal computing systems, and/or to external systems via a gateway.

The DTD computing system may be configured to provide a plurality of DTDS services. In this regard, the DTD computing system may transmit data to and/or receive data from application program interfaces (APIs) of external computing systems such that the DTD computing system may represent an operation that may be invoked (e.g., at runtime) by a client system, device, application, or a combination thereof. The digital trusted data request may be invoked at runtime to perform the digital trusted data service (e.g., to perform a task). The digital trusted data services may include a plurality of calls, functions, operations, etc. such as, but not limited to, the ones listed in Table 1.

TABLE 1

| Services | Description |
| --- | --- |
| getCustomerView | Return customer information such as addresses, phone numbers, e-mail addresses, and team member indicator (if a customer) |
| listAccounts | Get list of accounts and summary balances |
| getAccount | Get additional account details (e.g., account descriptor, account owner, statement address) |
| listTransactions | Get transaction details and history of transactions |
| listStatements | Get statements from image repositories |
| createTransactions-Transcript | Return all "posted" transaction data for an account between the startDate and endDate, and generate a document (in, e.g., PDF) |
| listHoldings | Return all current holdings specific to brokerage and trust accounts |
| getEmploymentIncome | Access Equifax and/or internal PeopleSoft for income information |
| searchEmployee | Return employee status, employee indicator, employee name |

For each discrete operation ("service"), certain inputs may be provided ("levers" may be pulled) to help direct its execution. For example: for the getCustomerView operation, values for XAID, ECN, and/or customerReference may be provided as three ways to identify a customer; for the listAccounts operation, values for includeOLAAccountsOnly, hoganProductCodes [ ], dataOrigins [ ], and/or apsAccountTypes[ ] may be provided to narrow the customer accounts to, for example, online accounts and/or external sources; for the getAccount operation, values for externalAccount[ ] and/or getRealtimeData may be provided to indicate that external account information (such as Early Warning account information) should be acquired, and/or to indicate that, for trust accounts, intraday values may be returned, and/or for brokerage accounts, 20-minute delayed balances may be returned; for the listTransactions operation, values for startDate, endDate, and/or includeUnpostedActivity may be provided to filter data using date ranges and transaction statuses (e.g., transactions with pending or posted status); for the create Transaction Transcript and listStatements operations, values for startDate and/or endDate may be provided to specify a date range to narrow searches; for the listHoldings operation, values for getRealtimeData may be provided to specify real-time quotes and/or intra-day activity (based on monetary cost of the data); and for the getEmploymentIncome operation, values for EquifaxPeopleSoftindicator may be provided to specify whether to access Equifax and/or internal PeopleSoft sources for income information.

In some embodiments, the DTD computing system may receive a digital trusted data request that identifies a digital trusted data service (e.g., createTransactionsTranscript). The request may include one or more parameters (e.g., preferences, customer token, company information, customer information, etc.). The one or more parameters may be utilized to determine whether a customer, internal computing system, external computing system, etc., is authorized to receive the requested digital trusted data service based on, for example, the customer token and one or more parameters (e.g., preferences) associated with a customer. Prior to providing trusted data in response to a digital trusted data request, a user (e.g., customer) may be authenticated by the DTD computing system. The user may be authenticated as an account holder, provider, etc. The user may be authenticated according to authentication credentials (e.g., authentication data) associated with that user. User authentication data may include any of a customer token, password, a PIN (personal identification number), a user ID, an answer to a verification question, a biometric, an identification of a security image, or a combination thereof. The DTD computing system may compare the received authentication data (e.g., the customer token) with known and verified user authentication data. If the authentication data provided does not match the known and verified user authentication data, the user is not authenticated. If the authentication data provided matches the known and verified user authentication data, the user is authenticated such that the provision of additional identification information or account information by the user is not required. If the DTD computing system determines that the customer is not authorized to receive digital trusted data, an invalid authorization notification may be returned. The invalid authorization notification may be output to the customer via, for example, a user interface, display, etc.

In some examples, a user may request data associated with each digital trusted data service (e.g., each possible operation) and receive all available data (e.g., data included within and/or accessible to the DTD computing system) associated with a customer. In other examples, a user may request data associated only with a specified digital trusted data service and receive partial customer data associated with a customer. For example, a digital trusted data request (e.g., a "getCustomerView" request) may return only customer information such as a list of addresses, phone numbers, emails and team member indicator (if a customer), high value indicator, etc. Another digital trusted data request (e.g., a "listAccounts" request) may return only a list of accounts and summary balances associated with one or more customers. Receiving certain data in this way instead of all available data of a customer enhances the speed and efficiency at which such data can be provided. The DTD computing system may verify and/or vet the validity of the data without the need to request information from a customer. Advantageously, a user can access digital trusted data about a customer without the need to access multiple systems or request information from the customer. Additionally, the complexities and data sources (internal and/or external to the service provider) remain hidden from the user. In some embodiments, the user of the system is an employee of the service provider (e.g., a loan officer helping a customer apply for a loan). In other embodiments, the user is an employee of a third party.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

An exemplary system for implementing the overall system or portions of the embodiments might include a general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:

determining, by a digital trusted data (DTD) computing system of a service provider, that an amount of time for a remote data source to provide remote trusted data in response to a corresponding request exceeds a threshold;

upon determining that the amount of time for the remote data source to provide the remote trusted data exceeds the threshold, retrieving and storing, via a corresponding application programming interface (API), the remote trusted data from the remote data source to improve response times for future data requests;

receiving, by an internal computing system of the service provider via a network, a request for an electronic form from a client software application executing on a client computing device of a client;

sending, by the internal computing system to the DTD computing system, a request for required data for the electronic form;

determining, by the DTD computing system, that a first portion of the required data for the electronic form was previously retrieved by the DTD computing system;

identifying, by the DTD computing system, a plurality of data sources from which to retrieve a remaining portion of the required data for the electronic form, the plurality of data sources corresponding to a plurality of services, each data source of the plurality of data sources associated with a respective reliability, the respective reliability of the data source determined based on historic data indicating accuracy of data retrieved from the data source, each of the plurality of services executed using a respective API call;

selecting, by the DTD computing system, a first trusted data source of the plurality of data sources based on the respective reliability of the first trusted data source being greater than the respective reliability of a second trusted data source of the plurality of data sources;

executing a first API call of the plurality of services to retrieve, by the DTD computing system, a first dataset from the first trusted data source of the plurality of data sources via a gateway computing device over the network to satisfy the request for the required data;

determining, by the DTD computing system, that a first value of the first dataset retrieved from the first trusted data source satisfies a threshold range of values, and that a second value of the required data is not included in the first dataset;

executing a second API call of the plurality of services to retrieve, by the DTD computing system, responsive to determining that the first value of the first dataset satisfies the threshold range of values and that the second value of the required data is not included in the first dataset, via the gateway computing device over the network, a second dataset from the second trusted data source of the plurality of data sources to satisfy the request for the required data, the second dataset including the second value;

sending, by the DTD computing system to the internal computing system, to satisfy the request for the required data, a plurality of values based on data previously obtained from the remote data source and on data obtained via at least one of the first trusted data source and the second trusted data source;

mapping, by the internal computing system, the plurality of values to corresponding fields of the electronic form;

generating, by the internal computing system, the electronic form having the corresponding fields populated with the plurality of values; and providing, by the internal computing system, the electronic form including the first portion of the required data and the remaining portion of the required data to the client software application executing on the client computing device.

2. The method of claim 1, further comprising providing, by the DTD computing system, to the client computing device, a message that indicates the request for the required data was unable to be retrieved by the DTD computing system.

3. The method of claim 1, further comprising mapping, by the internal computing system, the required data with the corresponding fields in the electronic form.

4. The method of claim 1, wherein the second trusted data source is accessed in response to the first value being greater than a first threshold value of the threshold range of values.

5. The method of claim 4, wherein the first value further comprising consolidating the first value and the second value before sending the first value and the second value to the internal computing system.

6. The method of claim 1, wherein the internal computing system is a first internal computing system of the service provider, and wherein the first trusted data source is a second internal computing system of the service provider.

7. The method of claim 6, wherein the second trusted data source is an external computing system of a third party.

8. The method of claim 1, wherein the first trusted data source is an external computing system of a third party.

9. The method of claim 8, wherein the external computing system is a first external computing system of a first entity, and wherein the second trusted data source is a second external computing system of a second entity.

10. The method of claim 1, further comprising:
   determining, by the internal computing system, a decision regarding whether to approve the client for a service associated with the electronic form; and
   providing, by the internal computing system, the decision to the client computing device.

11. The method of claim 1, wherein the plurality of values includes one or more of the first portion of the required data, the first value, or the second value.

12. The method of claim 1, further comprising:
   determining, by the DTD computing system, that a contradiction exists between at least one value of the first dataset retrieved from the first trusted data source and at least one other value of the second dataset retrieved from the second trusted data source, the contradiction identified responsive to the at least one value of the first dataset not matching the at least one other value of the second dataset; and
   selecting, by the DTD computing system, responsive to determining that the contradiction exists, based on the respective reliability of the first trusted data source and the respective reliability of the second trusted data source, a third value of the first dataset and a fourth value of the second dataset to satisfy the request for the required data.

13. The method of claim 12, wherein the plurality of values includes one or more of the first portion of the required data, the first value, the second value, the third value, or the fourth value.

14. A system for providing digital trusted data (DTD), the system comprising a DTD computing system of a service provider, the DTD computing system comprising:
   a processor;
   a network interface, wherein the DTD computing system is communicatively coupled, via the network interface, with an internal computing system of the service provider and a gateway computing device over a network; and
a memory having instructions that, when executed by the processor, are configured to direct the DTD computing system to:
   determine, that an amount of time for a remote data source to provide remote trusted data in response to a corresponding request exceeds a threshold;
   upon determining that the amount of time for the remote data source to provide the remote trusted data exceeds the threshold, retrieve and store, via a corresponding application programming interface (API), the remote trusted data from the remote data source to improve response times for future data requests;
   receive, from the internal computing system, a request for an electronic form from a client software application executing on a client computing device of a client,
   determine that a first portion of required data for the electronic form was previously retrieved by the DTD computing system;
   identify a plurality of data sources from which to retrieve a remaining portion of the required data for the electronic form, the plurality of data sources corresponding to a plurality of services, each data source of the plurality of data sources associated with a respective reliability, the respective reliability of the data source determined based on historic data indicating accuracy of data retrieved from the data source, each of the plurality of services executed using a respective API call;
   select a first trusted data source of the plurality of data sources based on the respective reliability of the first trusted data source being greater than the respective reliability of a second trusted data source of the plurality of data sources;
   execute a first API call of the plurality of services to retrieve, a first dataset from the first trusted data source of the plurality of data sources via the gateway computing device over the network to satisfy the request for the required data;
   determine that a first value of the first dataset retrieved from the first trusted data source has a value that satisfies a threshold range of values, and that a second value of the required data is not included in the first dataset;
   execute a second API call of the plurality of services to retrieve, responsive to determining that the first value of the first dataset satisfies the threshold range of values and that the second value of the required data is not included in the first dataset, via the gateway computing device over the network, a second dataset from the second trusted data source of the plurality of data sources to satisfy the request for the required data, the second dataset including the second value; and
   send a plurality of values based on the first dataset and the second dataset to the internal computing system to satisfy the request for the required data, causing the internal computing system to:
      map the plurality of values to corresponding fields of the electronic form,
      generate the electronic form having the corresponding fields populated with the plurality of values, and provide the electronic form including the plurality of values to the client computing device.

15. The system of claim 14, wherein the plurality of values comprises the first value and the second value.

16. The system of claim 14, wherein the DTD is further configured to:

determine that a contradiction exists between at least one value of the first dataset retrieved from the first trusted data source and at least one other value of the second dataset retrieved from the second trusted data source, the contradiction identified responsive to the at least one value of the first dataset not matching the at least one other value of the second dataset; and select, responsive to determining that the contradiction exists, based on the respective reliability of the first trusted data source and the respective reliability of the second trusted data source, a third value of the first dataset and a fourth value of the second dataset to satisfy the request for the required data.

17. The system of claim 16, wherein the plurality of values comprises the third value and the fourth value.

18. The system of claim 14, wherein the internal computing system is a first internal computing system, wherein the first trusted data source is a second internal computing system of the service provider, and wherein the second trusted data source is an external computing system of a third party.

19. The system of claim 14, wherein the second trusted data source is accessed in response to the first value being greater than a first threshold value of the threshold range of values.

20. The system of claim 19, wherein the DTD computing system is further configured to consolidate the first value and the second value before sending the first value and the second value to the internal computing system to satisfy the request for the required data.

\* \* \* \* \*